United States Patent [19]

Pedersen

[11] 3,856,813

[45] Dec. 24, 1974

[54] MACROCYCLIC SULFIDES

[75] Inventor: Charles J. Pedersen, Salem, N.J.

[73] Assignee: E. I. du Pont de Nemours and Company, Wilmington, Del.

[22] Filed: Dec. 12, 1972

[21] Appl. No.: 314,408

Related U.S. Application Data

[63] Continuation-in-part of Ser. No. 814,179, April 7, 1969, abandoned.

[52] U.S. Cl. .......... 260/327 B, 260/327 R, 260/152
[51] Int. Cl. ............................................. C07d 89/20
[58] Field of Search ..................... 260/327 B, 327 R

[56] References Cited
UNITED STATES PATENTS
3,687,978   8/1972   Pedersen.......................... 260/340.3

OTHER PUBLICATIONS
Conant, Chem. of Org. Cpds., (1947), p. 264–265.
Lowy, Int. Org. Chem., (1945), p. 213–215.
Pedersen, JACS, Vol., 89, No. 26, p. 7017–7036, (12-20-67).

Primary Examiner—Henry R. Jiles
Assistant Examiner—C. M. S. Jaisle
Attorney, Agent, or Firm—Donald W. Huntley

[57] ABSTRACT

Macrocyclic sulfides useful as complexing agents for ionic metal compounds and as dye intermediates are prepared, e.g., by the reaction of one or more carbocyclic nuclei having vicinal hydroxy or mercapto groups with a halogen-di-terminated alkylene, alkylene ether, alkylene thioether or alkylene ether thioether compound. The macrocyclic sulfides comprise a macrocyclic ring composed of oxygen and sulfur atoms separated one from the other by chains of from one to three carbon atoms, the ring having from 12 to 30 ring atoms and having fused thereto by vicinal carbon atoms from 1 to 4 cyclic aromatic hydrocarbons (e.g., benzene, naphthalene or cyclic nonaromatic hydrocarbons (e.g., cyclohexane, decalin).

17 Claims, No Drawings

MACROCYCLIC SULFIDES

CROSS REFERENCE TO RELATED APPLICATION

This is a continuation-in-part of copending application Ser. No. 814,179, filed Apr. 7, 1969 and now abandoned.

BACKGROUND OF THE INVENTION

This invention relates to macrocyclic sulfide compounds and in a particular aspect, to complexes of ionic metal compounds formed therewith.

In C. J. Pedersen, J. Am. Chem. Soc. 89, 7017 (1967), cyclic polyethers and their complexes with metal salts are reported. The cyclic compounds comprise macrocyclic polyether rings having carbocyclic nuclei fused thereto by vicinal carbon atoms. No atoms other than oxygen and carbon lie in the polyether ring. Cyclic thioethers, such as 4,7,13,16-tetraoxa-1,10-dithiacyclooctadecane have also been reported. J. R. Dann et al., J. Org. Chem. 26, 1991 (1961). Small yields of the thioethers, which contain no fused carbocyclic nuclei, are obtained by high dilution techniques. No mention is made of complexes of the thioethers with ionic metal compounds.

BRIEF SUMMARY OF THE INVENTION

According to this invention, there are provided macrocyclic sulfides characterized by a macrocyclic ring of carbon and hetero atoms totaling 12–30 ring atoms, at least one hetero atom being sulfur and the remainder being oxygen, each hetero atom in the ring being separated from its adjoining hetero atoms in the ring by 2 to 3 carbon atoms and the macrocyclic ring being fused by vicinal carbon atoms to 1–4 carbocyclic rings selected from the group:
 a. phenylene and naphthylene,
 b. saturated analogs of (a) and
 c. substitution derivatives of (a) or (b) from the group halo, nitro, amino,
 $C_1$–$C_4$ alkyl, $C_2$–$C_4$ alkenyl, $C_6$–$C_{12}$ aryl,
 $C_7$–$C_{16}$ aralkyl, $C_1$–$C_4$ alkoxy, cyano,
 hydroxy, carboxy or sulfo derivatives;
provided that a single pair of adjoining ring-sulfur atoms can be methylene-separated.

Solubility of the ring compounds in hydrocarbon media is enhances by presence of the fused carbocyclic nuclei, particularly where the latter are, e.g., t-butyl-substituted. In ring closure, the directional aspect of the vicinally difunctional carbocyclic reactants employed can contribute to increased yield. In some aspects, the compounds of the invention are superior in their complexing ability to polyethers reported in Pedersen, supra. For example, a macrocyclic sulfide having only 12 ring atoms will complex silver, and palladium, whereas a polyether of the same size but without ring-sulfur will not.

DETAILED DESCRIPTION OF THE INVENTION

Molecular models of representative compounds of the present invention have an annular configuration suggestive of a crown and, accordingly the macrocyclic sulfides of the invention are denoted "crown" compounds. Complexes of the compounds with ionic metal compounds are denoted crown complexes.

Basically, the macrocyclic sulfides are composed of from 1 to 4 vicinally divalent carbocyclic nuclei, e.g.,

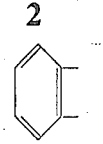

joined to form a macrocyclic sulfide containing from 4 to 10 oxygen or sulfur atoms (at least one sulfur atom) by oxygen or sulfur di-terminated alkylene groups [e.g., —O—($CH_2$)$_3$—S—] alkylene ether groups [e.g., —S—($CH_2$)$_2$—O—($CH_2$)—S—] alkylene thioether groups [e.g., —O—($CH_2$)$_2$—S—($CH_2$)$_2$—O—], or alkylene ether tioether groups [e.g., —O—($CH_2$)$_2$—S—($CH_2$)$_2$—O—($CH_2$)$_2$—S—]. As employed herein, the term "hetero-atom" refers to oxygen or sulfur atoms, and the term "ring atom" defines an atom lying in the backbone of the macrocyclic ring. For example, the compound

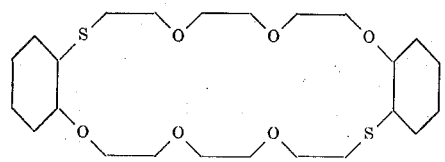

contains 24 ring atoms, of which 8 are hetero atoms. Macrocyclic sulfides having from 12 to 30 ring atoms are prepared according to the invention. Larger sulfide crowns can be made. However, as the compounds increase in ring-size, their capacity to complex smaller cations may fall off, and as a practical upper limit for commercial complexation, compounds having 30 ring atoms can be chosen. In general, macrocyclic sulfides having fewer than 12 ring atoms are unsatisfactory candidates for complexation.

To ensure reliable complexing, hetero atoms in the macrocyclic ring should be separated by no more than 3 ring-carbon atoms. It has been discovered that where more than a 3-carbon separation obtains, complexing will in most cases be impossible. Optimally, the ring-hetero atoms are separated from adjoining ring-hetero atoms by 2 ring carbon atoms, e.g., —$CH_2CH_2$—. Macrocyclic sulfides according to the invention can also be made in which a single pair of adjoining ring-sulfur atoms is methylene-separated, e.g., —S—$CH_2$—S—. With reference to all of the above, then, macrocyclic sulfides having from 12 to 30 ring atoms will contain from 4 to 10 hetero atoms, at least one hetero atom being sulfur. Sulfide crowns can be made in which all hetero atoms are sulfur, but appropriate safety precautions should be taken in handling the halogen di-terminated reactants employed (e.g., $\beta\beta'$-dichlorodiethylene sulfide, better known as mustard gas).

The carbocyclic nuclei which are vicinally fused to the macrocyclic ring are selected from the group consisting of monocyclic and polycyclic aromatic hydrocarbons of the benzo series consisting of from 1 to 3 fused rings (benzene, naphthalene, anthracene, phenanthrene), and the perhydro analogues thereof. The nuclei can be represented as Z-substituted, e.g.,

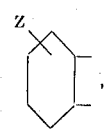

where Z is hydrogen, halo, nitro, amino, $C_1$-$C_4$ alkyl, $C_2$-$C_4$ alkenyl, $C_6$-$C_{12}$ aryl, $C_7$-$C_{16}$ aralkyl, $C_1$-$C_4$ alkoxy, cyano, hydroxy, carboxy, sulfo, and the like. Provided the substituent group is inert to the reactants employed in forming the novel sulfide crowns of the invention, the group can be present in the vicinally difunctional compounds which are preferred starting materials for the formation of the crown compounds. In other instances the substituent can be introduced after formation of the macrocyclic ring by conventional chemical reaction. In yet other instances the substituents can be formed by chemical reaction of other substituents, e.g., nitro groups can be reduced to amino groups.

Preferably, the sulfide crown contains from 1 to 2 carbocyclic nuclei and can be represented by the following formula:

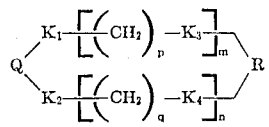

where Q and R are, independently, the vicinally monocyclic divalent or polycyclic aromatic hydrocarbons of the benzo series referred to above, or the perhydro analogues thereof, and R can additionally be —$CH_2CH_2$—. The units —$(CH_2)_p$—$K_3$— and —$(CH_2)_q$—$K_4$— constitute links in the ring-closing groups bridging Q and R. For each of such units, $K_3$ and $K_4$ are, independently, sulfur or oxygen; for each of such units, p and q are independently 2 or 3. Accordingly, for example, the macrocyclic ring can contain hetero atoms randomly selected from oxygen or sulfur, each hetero atom being separated from the next hetero atom by alternating chains of 2 and 3 ring-carbon atoms. $K_1$ and $K_2$, as shown, are independently oxygen or sulfur. So that the represented compounds fall within the specified ranges for ring atoms and hetero atoms contained in the sulfide crowns of the invention, m is from 1 to 7, n is from 1 to 7, and the sum of carbon and hetero atoms in the two chains

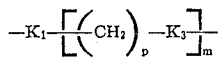

and

is from 6 to 24, preferably from 6 to 12.

One general procedure for the synthesis of compounds containing at least one aromatic fused nucleus involves the following reactants:

a. an aromatic nucleus having vicinal substituents which are, independently, hydroxy or mercapto (e.g., catechol, o-mercaptophenol, 1,2-benzenedithiol);

b. an alkylene, alkylene ether, alkylene thioether, or alkylene ether thioether compound which is halogen-di-terminated and in which the halogen, oxygen, and sulfur atoms are separated one from the other by chains of from 2 to 3 carbon atoms and the halogen is preferably chlorine but can also be bromine or iodine; and c. at least one equivalent of a strong base, preferably sodium hydroxide, for each hydroxy or mercapto substituent on the nucleus (a).

In general, equimolar quantities of (a) and (b) are consumed. The detailed procedure is selected to favor the particular type of crown compound desired and varies depending upon the nature of the particular (a) and (b) reactant. The reactant (b) is preferably unbranched and unsubstituted. Where desired, however, it can have $C_1$-$C_4$ alkyl side chains. In such case, the side chains are preferably $C_1$-$C_2$ alkyl to guard against steric hindrance in complex formation.

A typical reaction in which two molecules of (a), and two molecules of (b), as described above, are incorporated into the product is as follows:

(A)

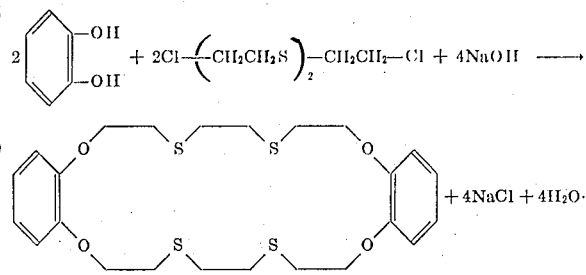

Actually, production of a monobenzo ring, e.g.,

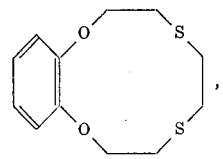

is favored when competing with a dibenzo product having 8 or more hetero atoms in the ring. When more than one macrocyclic sulfide is present in the reaction product conventional separation techniques such as selective solvent extraction, fractional distillation and fractional crystallization can be employed to obtain the compounds desired. Production of monoaromatic and other mixed products can, however, be avoided by a sequential reaction process in which the (a) reactant is partially blocked during the initial stages of reaction. For example, with reference to reaction (A) above, one phenolic hydroxyl group can conveniently be blocked by reaction with dihydropyran, typically:

(B)

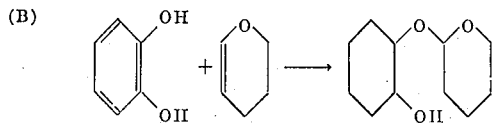

or alpha-chloromethyl ether (C)

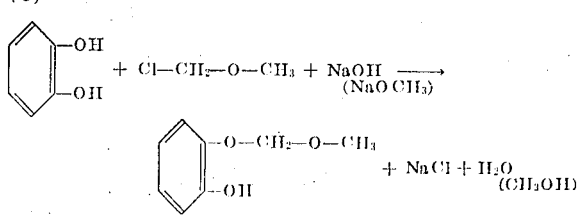

The blocked phenol is then reacted with the halogen diterminated straight chain reactant (b)

(D)

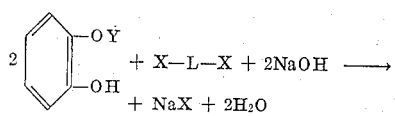

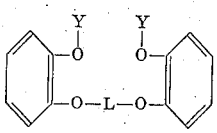

where X-L-X is the (b) reactant and Y is the blocking unit, e.g., —CH$_2$—O—CH$_3$. Treatment with acid gives a dihydric compound, e.g., (E)

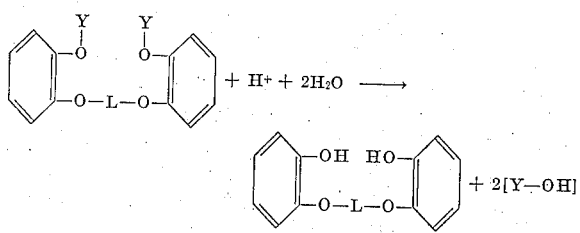

The dihydric compound can be isolated and purified, if desired. It can be partially blocked or it can be reacted directly with reactant (b). For example, the dihydric compound can be treated with a mole of X-L-X, where L is the same or a different divalent group to give the diaromatic macrocyclic sulfide.

By employing a reactant (b) containing an aromatic nucleus, the number of such nuclei appearing in the polysulfide product can be increased to three or more. Other methods for determining the placement and quantity of aromatic nuclei in the final product will be obvious to the skilled chemist by reference to the foregoing reactions.

When sequential synthesis involving blocking is employed, the blocked groups must be stable toward base under the conditions of the reaction with X-L-X. Regeneration of the phenolic hydroxyl group or mercapto group afterward should not adversely affect the ether groups present. In spite of the fact that use of temporary blocking groups diminishes the tendency toward formation of undesired by-products (particularly where a variety of straight chain (b) reactants are to be incorporated), it adds more reaction steps. Hence, where practical, it is preferred to make the macrocyclic sulfide by a one-step procedure.

A preferred carbocyclic reactant is o-mercaptophenol. Since the thiol group is more reactive than the hydroxyl group, selective reactions can be undertaken. For example, reaction with o-mercaptophenol and bis(β-chloroethyl) ether under different conditions can lead to different isomers wherein one ring is arranged O—O—O—S—O—S and the other is O—O—S—O—O—S. If the reaction mixture is lean in dihalide, an —S—CH$_2$CH$_2$—O—CH$_2$CH$_2$—S— bridged diphenol is produced and can be ring-closed with dihalide, giving the first arrangement. If the reaction mixture is rich in dihalide, —S—CH$_2$CH$_2$—O—CH$_2$CH$_2$—Cl substituted phenols are produced and coupled to give the second arrangement. If desired, the mercapto group of 2-(thiol) phenol can be blocked to allow the hydroxy group to react first.

While o-mercaptophenol is preferred, it is not required that the carbocyclic reactant contain sulfur. Thus, for example, a thiol di-terminated straight chain reactant can be employed, as in the reaction of 1,2-bis-(β-chloroethoxy) benzene and 1,2-bis(mercaptoethoxy) ethane to give an 18-membered monobenzo sulfide ring.

Generally, the macrocyclic sulfides are made in a solvent. In order to get good results, it is desirable that the solvent dissolve the basic reagent as well as the hydroxy or mercapto-terminated reactant and the dihalide. Representative solvent systems include mixtures of water and butyl alcohol; lower alkyl ether derivatives of ethylene glycol; dioxane; alcohols; mixtures of ether and alcohol. The amount of solvent needed can be selected on the basis of operating convenience for a particular set of reactants.

The base for carrying out the substitution reaction is a group IA metal hydroxide, with sodium hydroxide being preferred. In place of the inorganic bases one can use quaternary ammonium hydroxides such as tetramethyl ammonium hydroxide or tetraethyl ammonium hydroxide.

The reaction can be carried out over a wide range of temperatures. For operating convenience, temperatures from about 90°C. to about 140°C. are preferred. The reaction time will vary depending upon the temperature and other factors. Other conditions being equal, the higher the temperature the shorter the time. Typically, time has ranged from about 6 hours to about 24 hours. The most suitable time and temperature for a particular set of reactants can be determined by routine experimentation.

The crown product can be isolated by conventional methods such as by concentration of the reaction mixture or by mechanical collection of insoluble (or precipitated) product. The crown compounds are freed from impurities, such as straight-chain reactants by recrystallization from organic liquids such as alcohol, chloroform, 2-ethoxyethanol, benzene and heptane.

The carbocyclic nuclei fused to the macrocyclic ring can be either aromatic or saturated. In general, complexes formed with saturated crown compounds are more soluble and stable than are those formed with aromatic crown compounds. On the other hand, the presence in the crown compound of aromatic nuclei carries with it certain advantages. For example, complex formation with aromatic crowns can be followed by commercial ultraviolet spectrophotometers. The fully saturated crown compounds do not absorb within the limits of such instruments. By appropriate choice of reactants or by partially hydrogenating aromatic crown compounds, so as to obtain compounds having both aromatic and saturated nuclei fused thereto, compromise compounds having the advantages of each type can be prepared.

Various methods of incorporating saturated carbocyclic nuclei in the crown compounds will be apparent to the art-skilled. For example, 1,2-dimercaptocyclohexane can be reacted directly with the dihalide reactant to produce a macrocyclic ring having cyclohexane fused to it. Again, saturated compounds like 1,2-bis(β-chloroethoxy) cyclohexane can be reacted with a mercapto di-terminated open chain reactant to yield a saturated sulfide crown. Aromatic crowns can be fully or partially saturated by catalytic hydrogenation. While this approach is no doubt the most direct route to the saturated crowns, care must be exercised to avoid sulfur-poisoning of the catalysts employed. Suitable candidates for the hydrogenation catalyst are the cobalt sulfide catalysts of U.S. Pat. Nos. 2,402,626 and 2,402,684, nickel sulfide, palladium, rhodium and other hydrogenation catalysts known to the art-skilled to be sulfur resistant. The solvent can be any suitable hydrogenation solvent which will dissolve the crown compounds. Dioxane is suitable as a solvent. The aromatic crown complexes of non-reducible salts such as the alkali metal halides can be hydrogenated in alcohols such as methanol and n-butanol.

The temperature of hydrogenation is suitably from 60° to 120°C. Pressures can range from 500 to 2000 psig. Typical times required are from 3 to 20 hours. It will be realized, however, that these values are not critical.

During hydrogenation some cleavage of the macrocyclic ring occurs, leading to the formation of by-products in addition to the desired hydrogenation product. These by-products can be separated and the desired hydrogenation product can be isolated by conventional physical methods, such as fractional crystallization and the like from solvents such as alcohol, chloroform, 2-ethoxy-ethanol, benzene and heptane, or by chromatographic separation. If the desired macrocyclic sulfide does not otherwise contain active hydrogen groups, the reaction mixture can be reacted with reagents such as organic isocyanates, which react readily with hydroxy or mercapto compounds, to facilitate separation of the by-products.

The sulfide crowns of the invention can form novel complexes with ionic metal compounds such as those having as cations cobalt (II), sodium, potassium, gold, silver and palladium. The sulfur crowns are especially effective in forming complexes with $Pd^{+2}$ and $Ag^+$ ions, but have a much reduced tendency to complex with $K^+$. The complexes appear to be formed by ion-dipole interaction between the cation of the metal compound and the basic hetero atoms placed about the macrocyclic ring. Accordingly, the cation of the metal compound plays a major part in complexation, while its anion plays a relatively minor role.

Crystalline complexes can be prepared by dissolving the crown compound and metal compound in a solvent which dissolves each and which is later removed by evaporation from the resulting complex, usually under vacuum. Alternatively, complexes can be prepared by dissolving crown compound and metal compound in a minimum quantity of hot solvent which dissolves each, the resulting complex being precipitated by cooling and mechanically separated, e.g., by filtration, centrifugation, etc. Again, crown compound can be heated with metal compound in a solvent in which only the latter is readily soluble, the crown compound being converted into a crystalline complex without the system ever becoming a clear solution. The complex is then recovered by filtration. Other methods of complex formation will occur to the art-skilled in light of the above.

In general, complexes prepared according to this invention can solubilize complexed metal compounds in hydrocarbon media wherein they are normally insoluble. This property alone suggests manifold applications of the invention in industry. For example, the benzene-soluble sodium nitrite complex can be used as a corrosion inhibitor of iron and steel in non-aqueous systems, and to effect the diazotization and nitrozation of amino compounds in media in which they are normally insoluble. In general, nearly any reaction in which the uncrowned (uncomplexed) metal compound can participate in aqueous or alcoholic media can be carried out in hydrocarbon media by using the corresponding crowned (complexed) reagents.

The unique complexing properties of the present crown compounds render them particularly applicable to analytical procedures, and the silver complexing properties in particular could be of benefit in the preparation of silver-containing photographic emulsions.

The crown compounds are useful for the separation of dissolved salts. The salt which can form a crown complex can thereafter be extracted by an immiscible solvent which cannot dissolve the uncomplexed salts present. By way of illustration, water soluble salts that form crowned complexes can be separated from salts that do not; a water-insoluble solvent for the complex is employed for the extraction. For example, 2,3-(4'-methylbenzo)-1,4-dithia-7,10,13,16-tetraoxacyclooctadeca-2-ene does not complex with magnesium ion; hence, silver salts can be separated from magnesium salts by this method.

The crown compounds of the invention can also be used as dye intermediates by adding an active hydrogen containing substituent, e.g., OH—, amino, etc. to the aromatic nucleus by conventional techniques and thereafter coupling the compound with a diazo compound according to well-known methods.

The following examples are illustrative of compounds of the invention. Parts and percentages are by weight unless otherwise stated.

EXAMPLE 1

Preparation of 2,8,15,21-Tetrathia-5,18-Dioxatricyclo [20.4.0.09.14]Hexacosane

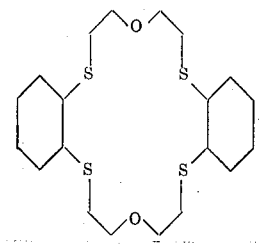

A macrocyclic sulfide of the formula $C_{20}H_{36}O_2S_4$ and the structure indicated is prepared by stepwise addition of dihalide to a cycloaliphatic dithiol.

Cyclohexene trithiocarbonate is prepared for cyclohexene oxide and carbon disulfide (yield: 87 percent according to C. C. J. Culvenor, W. Davies, and K. H. Pausacker, J. Chem. Soc. (London), 1050 (1946).

Cyclohexene trithiocarbonate is converted into cyclohexane-trans-1,2-dithiol in ether-tetrahydrofuran with lithium aluminum hydride (yield: 90 percent) according to S. M. Iqbal and L. N. Owen, J. Chem. Soc. (London), 1030 (1960). Boiling point: 104°-6°C./18-9 mm. $C_6H_{12}S_2$; molecular weight 148; S 43.2 percent.

A 3-liter round-bottom flask, equipped with a thermometer, a reflux condenser, a dropping-funnel, an agitator, and nitrogen cover, is charged with 57.4 g. (ca. 0.365 g.-mol) of crude cyclohexane-trans-1,2-dithiol, 500 ml. of 1-butanol, and 14.6 g. (0.365 g.-mol) of sodium hydroxide in 20 ml. of water. The temperature of the charge is raised to 60°C. and 26.1 g. (0.182 g.-mol) of bis [2-chloroethyl] ether diluted with 70 ml. of 1- butanol are added dropwise during one hour while the temperature is allowed to rise to reflux (103°C.). The charge is cooled to 95°C., a second 14.6 g. portion of sodium hydroxide is dissolved in 20 ml. of water is added, the temperature is again raised to reflux, and 26.1 g. of bis[2-chloromethyl] ether diluted with 70 ml. of 1-butanol are added dropwise in one hour. The charge is refluxed for two more hours (pot temperature: 103°C.). The charge is then filtered. Evaporation of the filtrate typically gives 39.5 g. of very viscous syrup which is subsequently dissolved in benzene and chromatographed on acid-washed alumina (1.75 × 6 inches). The first 250 ml. of eluate typically contains 23.7 g. of the desired product as a light yellow, viscous oil. Yield: typically 30 percent.

|  | Found for Product |  | Calculated for $C_{20}H_{36}O_2S_4$ |
| --- | --- | --- | --- |
| C:% | 56.7, | 57.0 | 55.0 |
| H:% | 6.9, | 7.2 | 8.3 |
| S:% | 28.8 |  | 29.4 |
| Molecular Wt.: | 432 |  | 436 |

EXAMPLE 2

Preparation of 2,3,11,12-Bis(4' and/or 5'-Methylbenzo)-1,4,10,13-Tetrathia-7,16-Dioxacyclooctadeca-2,11-Diene

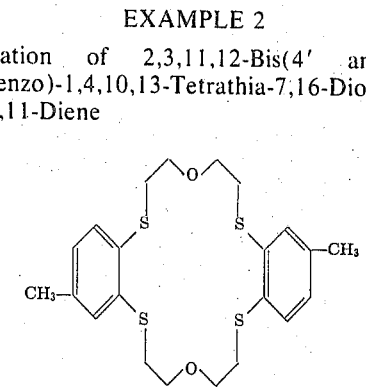

A macrocyclic sulfide of the formula $C_{22}H_{28}O_2S_4$ and structure such as is indicated is prepared by stepwise addition of dihalide to an aromatic dithiol.

A 2-liter, round-bottom flask, equipped with a thermometer, a reflux condenser, an agitator, and nitrogen cover, is charged with 48.8 g. (0.313 g.-mol) of toluene-3,4-dithiol, 500 ml. of n-butanol and 20.7 g. (0.313 g.-mol) of 85 percent potassium hydroxide. After this mixture has been heated to reflux (pot temperature 114°C.), 22.5 g. (0.157 g.-mol) of bis (2-chloroethyl) ether diluted with 50 ml. of n-butanol are added dropwise during the next two hours. After another hour at the reflux, the charge is cooled to 76°C., for addition of a second 20.7 g. portion of 85 percent potassium hydroxide. The temperature is once more raised to cause refluxing. During the next hour a second, 22.5-g. portion of bis [2-chloroethyl] ether diluted with 50 ml. of n-butanol is added dropwise. Finally the charge is refluxed for four hours (pot temperature 109°C.).

After the mixture has been acidified with 3 ml. of concentrated hydrochloric acid, n-butanol is distilled off while the volume is kept constant by the addition of water. The pinkish paste that separates from the aqueous phase is dissolved in 600 ml. of chloroform and extracted with 400 ml. of 5 percent aqueous sodium hydroxide. The chloroform solution is dried with calcium chloride, filtered, and freed of volatiles in a rotary vacuum evaporator at 100°C. The residue (67.2 g.) a very thick, sticky paste, is extracted with n-heptane, then with acetone. From these extracts, white, shiny crystals of the desired compound are recovered.

|  | Found for Product |  | Calculated for $C_{22}H_{28}O_2S_4$ |
| --- | --- | --- | --- |
| C:% | 58.7, | 59.2 | 58.4 |
| H:% | 5.9, | 6.0 | 6.2 |
| S:% | 27.6 |  | 28.3 |
| Molecular Wt. | 462 |  | 452 |
| Melting point:147°C. (Aluminum block) |  |  |  |

EXAMPLE 3

Preparation of 2,3,11,12-Bis(4' and/or 5'-Methylbenzo)-1,4,10,13-Tetrathia-7,16-Dioxacyclooctadeca-2,11-Diene The compound of Example 2 is prepared by a stepwise process in which one mercapto group of an aromatic diothiol is blocked and later liberated.

A one-liter round-bottom glass reaction flask, equipped with a thermometer, reflux condenser, dropping funnel, and an agitator, is charged under nitrogen with 12.1 g.(0.0776 g.-mol) of toluene-3,4-dithiol, 100 ml. of n-butanol, and a solution of 3.1 g. (0.0776 g.-mol) of sodium hydroxide in 100 ml. of deaerated water. To the resulting mono-sodium salt of toluene-3,4-dithiol is then added 6.25 g. (5.9 ml; 0.0777 g.-mol) of chloromethyl methyl ether. After the mixture has been stirred for one hour at ambient temperature, the methoxymethylthio derivative is recovered from the turbid charge by removal of volatiles in a rotary vacuum evaporator. The mixture of oil and white solid obtained, weighing about 22.8 g., is returned to the reaction flask under nitrogen; then 100 ml. of n-butanol, a solution of 3.1 g. (0.0776 g.-mol) of sodium hydroxide in 100 ml. deaerated water, and 5.6 g. (4.6 ml.; 0.0392 g.-mol) of bis (β-chloroethyl) ether are introduced. The resulting mixture is agitated at reflux for about 36 minutes (pot temperature 95°C.). Removal of volatiles from the mixture in a rotary vacuum evaporator at 60°C. gives about 25.4 g. of the dibenzo compound [C-$H_3$—$C_6H_3$S($CH_2$—$OCH_3$)—S—$CH_2$—$CH_2$—]$_2$O as a white semi-solid.

The blocked thiol groups in the above product are liberated by adding it under nitrogen to a mixture of 50 ml. of glacial acetic acid, 50 ml. deaerated water, and 0.4 ml. of concentrated sulfuric acid and heating for one hour on a steam bath. After volatiles have been removed from the resulting mixture in a rotary vacuum evaporator, the dithiol is taken up in benzene and recovered therefrom in a rotary vacuum evaporator. Yield: about 16.6 g. of a white semi-solid.

The thiol thus prepared is then placed under nitrogen in an agitated 500 ml. glass reaction flask. To it are added 100 ml. of n-butanol, a solution of 3.1 g. (0.0776 g.-mol) of sodium hydroxide in 100 ml. of deaerated water, and 5.6 g. (4.6 ml.: 0.0392 g.-mol) of bis(β-chloromethyl) ether. The resulting mixture is refluxed (pot temperature 94°C.) for 6 hours and 20 minutes. Removal of volatiles in a rotary vacuum evaporator gives 22.3 g. of a light yellow, semi-solid. After this residue has been mixed with 100 g. of 10 percent aqueous sodium hydroxide solution containing 2 g. of $Na_2S_2O_4$, it is heated on a steam bath for 10 minutes. A 400 ml. portion of benzene is added; the benzene layer which separates is then treated with 10 percent aqueous sodium hydroxide, filtered, and freed from volatiles in a rotary vacuum evaporator. The 2,3,11,12-bis(4' and/or 5'-methylbenzo)-1,4,10,13-tetrathia-7,16-dioxacyclooctadeca-2,11-diene is recovered as a yellow oil in a 12.4 gram yield. This material is somewhat soluble in methanol and more soluble in acetone.

|  | Found for Product |  | Calculated for $C_{22}H_{28}O_2S_4$ |
| --- | --- | --- | --- |
| C:% | 56.1, | 56.4 | 58.4 |
| H:% | 5.9, | 6.0 | 6.2 |
| S:% | 28.9 |  | 28.3 |

EXAMPLE 4

Preparation of 2,3-(4'-Methylbenzo)-1,4-Dithia-7,10,13,16-Tetraoxacyclooctadeca-2-Ene

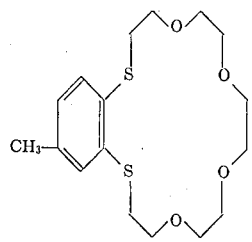

A macrocyclic polysulfide of the formula $C_{17}H_{26}O_4S_2$ and the structure indicated is prepared by one-step mixing of all the dihalide and an aromatic dithiol.

A one-liter round-bottom flask, equipped with a thermometer, a reflux condenser, an agitator and nitrogen cover is charged with 15.6 g. (0.1 g.-mol) of toluene-3,4-dithiol, 400 ml. of n-butanol, 27.5 g. (0.1 g.-mol) of 1,14-dichloro-3,6,9,12-tetraoxatetradecane, and 8.0 g. (0.2 g.-mol) of sodium hydroxide dissolved in 10 ml. of water. The resulting mixture is refluxed under nitrogen with good agitation for 6 hours (pot temperature 105.5°C.).

The warm reaction mass is filtered, insolubles are washed with 100 ml. of n-butanol, and filtrate and washings are concentrated in a rotary vacuum evaporator to give a viscous oil. In a typical run, 29.3 grams are obtained analyzing as follows:

|  | Found for Product |  | Calculated for $C_{17}H_{26}O_4S_2$ |
| --- | --- | --- | --- |
| C:% | 55.0, | 55.2 | 57.0 |
| H:% | 6.8, | 7.1 | 7.3 |
| S:% | 17.7 |  | 17.9 |
| Molecular Wt.: | 417 |  | 358 |

This material is chromatographed on a column (1.75 × 5 inches) of acid-washed, 200-mesh alumina. The portion that comes off with 500 ml. of benzene, typically 20.1 g. of viscous oil, is the desired compound. Yield: 56 percent.
Analysis is as follows:

|  | Found for Product | |
| --- | --- | --- |
| C:% | 56.4, | 56.5 |
| H:% | 7.3, | 7.4 |
| S:% | 17.9, | 18.0 |
| Molecular Wt.: | 382 | |

Infrared spectrum: no OH or SH band; ether band near 9 μ.

EXAMPLE 5

Preparation of 2,3-Benzo-1,4-Dioxa-7,10-Dithiacyclododeca-2-Ene

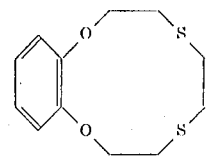

A macrocyclic sulfide of the formula $C_{12}H_{16}O_2S_2$ and the structure indicated is prepared using an aromatic dihalide and sodium sulfide.

A 3-liter round-bottom flask, equipped with a thermometer, a reflux condenser, an agitator and nitrogen cover, is charged with 1050 ml. of ethyl alcohol, 24.0 g. (0.1 g.-mol) of sodium sulfide nonahydrate in 950 ml. of water, and 23.5 g. (0.1 g.-mol) of 1,2-bis(β-chloroethoxy)benzene, and refluxed under a cover of nitrogen for 99 hours during which time the pot temperature drops from 84.1° to 81.5°C.

The charge is evaporated in a rotary vacuum evaporator to 780 g. and extracted three times with 200 ml. of chloroform. The chloroform solution is washed with 200 ml. of 5 percent aqueous sodium hydroxide, dried, filtered and evaporated to dryness. The residue, 10.9 g. of viscous oil, is distilled from a rotary vacuum evaporator at 0.4 mm. The distillate, 5.2 g., contains about 4.3 g. of the product. [Yield: about 34 percent] Recrystallization from methanol gives white crystals typically having the following properties:

|  | Found for Product |  | Calculated for $C_{12}H_{16}O_2S_2$ |
| --- | --- | --- | --- |
| C:% | 56.0, | 56.0 | 56.2 |
| H:% | 5.9, | 6.0 | 6.2 |
| S:% | 24.7 |  | 25.0 |
| Melting point: 92°C (Aluminum block) |  |  |  |
| Molecular weight | 257 |  |  |

EXAMPLE 6

Preparation of 2,3-Benzo-1,4,10,13-Tetraoxa-7,16-Dithiacyclooctadeca-2-Ene

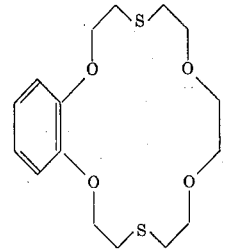

A macrocyclic sulfide of the formula $C_{16}H_{24}O_4S_2$ and the structure indicated is prepared by the reaction of an aromatic dihalide and an open-chain aliphatic dithiol.

A 5-liter round-bottom flask equipped with a thermometer, a reflux condenser, an agitator and nitrogen cover, is charged with 900 ml. of ethyl alcohol, 900 ml. of water and 6.4 g. (0.06 g.-mol) of anhydrous sodium carbonate, and brought to reflux under a cover of nitrogen. Then, dropwise, 100 ml. of ethyl alcohol containing 14.0 g. (0.06-g.-mol) of 1,2-bis($\beta$-chloroethoxy)-benzene and 11.0 g. (0.06 g.-mol) of 1,2-bis(mercaptoethoxy) ethane are added during a one-hour period.

After the charge has been refluxed for about 16 hours, it is filtered to remove the salt. The filtrate is freed from volatiles in a rotary vacuum evaporator to give a brownish paste [9.2 g.]. White fibrous crystals, recovered by recrystallizing the product from ethyl alcohol, typically analyze as follows:

|  | Found for Product | Calculated for $C_{16}H_{24}O_4S_2$ |
|---|---|---|
| C:% | 54.8, | 55.0 | 55.8 |
| H:% | 7.1, | 7.1 | 7.0 |
| S:% | 17.4 | | 18.6 |
| Melting point: 91°C. (Aluminum block) | | | |

EXAMPLE 7

Preparation of 2,3,11,12-Dibenzo-1,7,10,16-Tetraoxa-4,13-Dithiacyclooctadeca-2,11-Diene

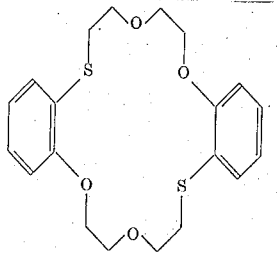

A macrocyclic sulfide of the formula $C_{20}H_{24}O_4S_2$ and the structure indicated is prepared by the reaction of o-mercaptophenol and dihalide to yield $-S-CH_2-CH_2-O-CH_2-CH_2-Cl-$ substituted phenols which are then coupled.

A 3-liter round-bottom flask, equipped with a thermometer, a reflux condenser, a dropping funnel, and an agitator, is charged under nitrogen with 70.6 g. (0.56 g.-mol) of 2-mercaptophenol, 300 ml. of n-butanol, a solution 22.4 g. (0.56 g.-mol) of sodium hydroxide in 25 ml. of water, and a solution of 160 g. (1.12 g.-mols) of bis($\beta$-chloroethyl)ether in 360 mm. of n-butanol. The resulting mixture is refluxed for 2 hours and then distilled (initial head temperature 92.5°C.). After 650 ml. of distillate has been collected, 1,000 ml. of water is slowly added while distillation continues to remove unreacted bis($\beta$-chloroethyl) ether from the 2-(5'-chloro-3'-oxapentylthio)-phenol. When the vapor temperature is 100°C., a solution of 22.4 g (0.56 g.-mol) of sodium hydroxide in 25 ml. of water and 400 ml. of butanol is added rapidly [to form the salt of the phenolic hydroxyl groups and allow 2 molecules to be coupled by loss of Cl from each 5-chloro-3-oxapentyl group to form the ring]. The mixture is refluxed for a total of 20 hours at 97°C. and then freed from volatiles by distillation in the presence of water.

The residue is filtered and washed with chloroform. The yellow oil in the filtrate is separated, dissolved in chloroform, extracted twice with aqueous sodium hydroxide, and freed from volatiles. A total yield of 29.7 g. of light yellow oil results. For purification this oil is chromatographed into 3 fractions using benzene and alumina: A. 13.3 g.; B. 10.3 g.; C. 1.0 g. Fraction B is extracted with 100 ml. n-hexane and cooled. 2,3,11,12-Dibenzo-1,7,10,16-tetraoxa-4,13-dithiacyclooctadeca-2,11-diene is obtained as white crystals, melting at 113.5°C. Analysis is as follows:

|  | Found for Product | Calculated for $C_{20}H_{24}O_4S_2$ |
|---|---|---|
| C:% | 61.2, | 61.4 | 61.2 |
| H:% | 5.8, | 6.1 | 6.1 |
| S:% | 16.3 | | 16.3 |
| Molecular Weight | 357 | | 392 |

EXAMPLE 8

Preparation of 2,3,11,12-Dibenzo-4,7,10,16-Tetraoxa-1,13-Dithiacycloocta-2,11-Diene

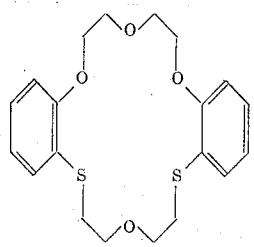

A macrocyclic sulfide of the formula $C_{20}H_{24}O_4S_2$ and the structure indicated is prepared by reaction of o-mercaptophenol and dihalide to form an $-S-CH_2-CH_2-O-CH_2-CH_2-S-$ bridged diphenol which is then ring-closed with dihalide.

A 3-liter round-bottom flask, equipped with a thermometer, reflux condenser, dropping funnel, and an agitator is charged under nitrogen with 126 g. (1 g.-mol) 2-mercaptophenol, 1000 ml. of sec-butyl alcohol, and 40 g. (1 g.-mol) of sodium hydroxide. After the mixture is brought to reflux at 100°C., a mixture of 74 g. (0.516 g.-mol) of bis(2-chloroethyl)ether and 50 ml. of sec-butyl alcohol is added dropwise. After 2 hours, another 40-g. portion of sodium hydroxide is added. Following a 30 minute refluxing period, a second 74-g. portion of bis(2-chloroethyl)ether in 50 ml. sec-butyl alcohol is added over a 2 hour period.

The reaction mixture is acidified with 30 ml. (0.36 g.-mol) of concentrated hydrochloric acid, mixed with 200 ml. water, and distilled at a head temperature below 100°C. while more water is added to replace the material distilling over.

When the vapor temperature reaches 100°C., heat is removed and the residue is freed from liquid on a suction funnel, washed with water and then with acetone, and dried at 91°C. in a vacuum oven. Yield: 60.4 g.

The 2,3,11,12-dibenzo-1,7,13,16-tetraoxa-4,10-dithiacyclooctadeca-2,11-diene is obtained as white, fibrous crystals melting at 143°-4°C. Analysis is as follows:

|  | Found for Product | Calculated for $C_{20}H_{24}O_4S_2$ |
|---|---|---|
| C:% | 61.2, | 61.4 | 61.2 |
| H:% | 6.1, | 6.1 | 6.1 |
| S:% | 16.7 | | 16.3 |
| Molecular Weight | 371, 384 | | 392 |

EXAMPLE 9

Preparation of 2,3,7,8-Dibenzo-1,9,12-Trioxa-4,6-Dithiacyclotetradeca-2,7-Diene

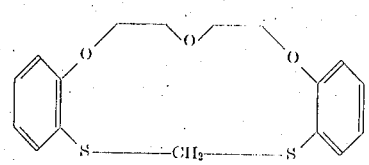

A macrocyclic sulfide of the formula $C_{17}H_{18}O_3S_2$ and the structure indicated is prepared by the reaction of dihalide and $-S-CH_2-S-$ bridged diphenol. The diphenol reactant may be prepared by the reaction of formaldehyde and 2-thio-phenol.

A 13.4 g. portion (0.0936 g.-mol) of bis(2-chloroethyl)ether diluted with 50 ml. of butanol is added dropwise under nitrogen at room temperature to an agitated mixture made by combining a solution of 24.7 g. (0.0936 g.-mol) of methylene-bis[2-(thio)phenol] in 200 ml. of n-butanol with a solution of 7.5 g. (0.188 g.-mol) of sodium hydroxide in 10 ml. of water. The reactants are heated for 16 hours at 109°–118.5°C. Solvents are then removed in a rotary vacuum evaporator. The residue is dissolved in 200 ml. of chloroform and washed twice with 100 ml. of 5 percent aqueous sodium hydroxide. After the chloroform solution has been filtered, the filtrate is concentrated to dryness in a rotary vacuum evaporator. Crude 2,3,7,8-dibenzo-1,9,12-trioxa-4,6-dithiacyclotetradeca-2,7-diene is typically obtained in 20.3 gram yield as a very viscous liquid. Recrystallization from n-heptane gives white crystals, m.p. 150°–153°C. Analysis is as follows:

|      | Found for Product | Calculated for $C_{17}H_{13}O_3S_2$ |
|------|------|------|
| C:%  | 59.4, | 60.9 | 61.0 |
| H:%  | 5.0,  | 5.0  | 5.4 |
| S:%  | 19.7  |      | 19.2 |

EXAMPLE 10

Extraction of $Ag^+$ and $Na^+$ from Water by 2,8,15,21-Tetrathia-5,18-Dioxatricyclo[20.4.0.0$^{9,14}$]Hexacosane The extraction of silver and sodium ions from water is illustrated, using the compound prepared in Example 1.

The ability of the 2,8,15,21-tetrathia-5,18-dioxatricyclo 20.4.0.0$^{9,14}$ hexacosane, called "HC" hereinafter for convenience, to extract ions from water can be followed by using picric acid to provide a color indicative of the cation concentration. Equal volumes of methylene chloride (0.00007 molar in picric acid and 0.000064 molar in HC) and water (0.059 molar in silver nitrate) are shaken at 25°C. and allowed to equilibrate. Then the yellow organic phase is separated and analyzed spectrophotometrically for picrate ion. About 68.3 percent of the HC has formed a 1:1 complex with silver and thereby transferred it to the methylene chloride phase. Since the HC:$Ag^+$ complex includes yellow colored picrate anion, the methylene chloride phase has the observed yellow color. HC:$Ag^+$ picrate is more soluble in methylene chloride than in water. The remaining silver ion, which is not complexed by HC, takes all of the remaining picrate with it into the aqueous phase. The relative depth of yellow coloration in the methylene chloride and the aqueous phases is indicative of how effective the HC has been.

When n-octadecyl sulfide, a compound outside the scope of the present invention is substituted for HC, only 0.1 percent of it is able to complex with silver ion. The organic phase is colorless, there being no complexed silver ion to attract the picrate anion (which has, accordingly, been transferred to the aqueous phase where the silver ions are).

When 0.125 molar aqueous sodium hydroxide is extracted in accordance with the above procedure, 2.2 percent of the HC forms a 1:1 complex with sodium ion. In contrast, n-octadecyl sulfide is unable to extract any sodium ion.

EXAMPLE 11

Extraction of $Ag^+$ and $K^+$ from Water by Various Macrocyclic Ring Compounds

The general procedure of Example 10 is followed in illustrating the effectiveness of other compounds of the invention to complex with silver ions and potassium ions. Two macrocyclic polyether compounds, outside the scope of the present invention, are included for comparison. The methylene chloride solution is 0.00007 molar in picric acid and 0.00007 molar in ring compound. The aqueous solutions are 0.1 molar in silver nitrate or potassium nitrate. The results obtained are as follows:

| Extracting Agent (EA) | % EA Complexed with | |
|---|---|---|
| | $Ag^+$ | $K^+$ |
| A | 92 | 6 |
| B | 52 | 2 |
| C | 77 | 2 |
| D* | 38 | 42 |
| E* | 63 | 69 |

*Outside the scope of the invention; for comparison only.

A. is 2,3,11,12-bis(4' and/or 5'-methylbenzo)-1,4,10,13-tetrathio-7,16-dioxacyclooctadeca-2,11-diene (Example 2).

B. is 2,3-(4'-methylbenzo)-1,4-dithio-7,10,13-trioxacyclooctadeca-2-ene made by a procedure analogous to that of Example 4.

C. is 2,3-(4'-methylbenzo)-1,4-dithio-7,10,13,16-tetraoxacyclooctadeca-2-ene (Example 4).

D. is 2,3,11,12-dibenzo-1,4,7,10,13,16-hexaoxacyclooctadeca-2,11-diene; see U.S. Pat. No. 3,687,978 (Pedersen), issued Aug. 29, 1972.

E. is 2,5,8,15,21-hexaoxatricyclo[20.4.0.0$^{9,14}$]hexacosane; the result of hydrogenating compound (D). See U.S. Pat. No. 3,687,978 (Pedersen), issued Aug. 29, 1972.

EXAMPLE 12

Complexing Behaviour of Crown Compounds Toward Various Metal Cations

This example illustrates differences in complexing behavior of the sulfur crowns of this invention and polyether crowns of the prior art with respect to Pd(II) and K(I) ions.

Three macrocyclic crown compounds are prepared as follows:

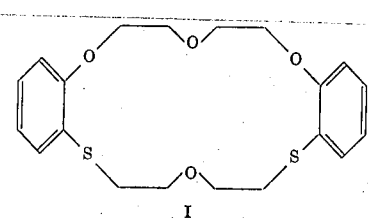

I 2,3,11,12-Dibenzo-4,7,10,16-tetraoxa-1,13-dithiacycloocta-2,11-diene having the structure shown at the left is prepared as described in Example 8 of this patent application.

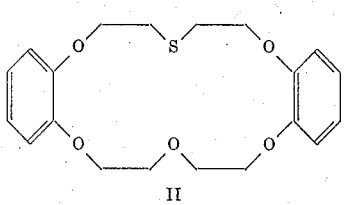

II 5,6,14,15-Dibenzo-1-thia-4,7,10,13,16-pentaoxacyclooctadeca-5,14-diene having the structure shown at the left is prepared as follows:

Bis(2-chloroethyl)ether (143 grams, one mole) is added to 220 grams catechol dissolved in 2100 milliliters of water containing 80 grams sodium hydroxide. The solution is heated at 65°C. for 16 hours and then refluxed for 75 minutes. Another 61 grams of bis(2-chloroethyl)ether is added and the solution refluxed for 24 hours. Hydrochloric acid is added until the solution is acid (pH=3) and unreacted bis(2-chloroethyl)ether is removed by steam distillation. The residue consists of three layers. The organic upper and lower layers are dissolved in 700 milliliters of methanol and chilled to give 57 grams of bis[2-(o-hydroxy phenoxy)ethyl]ether (A).

Five grams of A is then added to 4.75 grams of 50 percent by weight sodium hydroxide diluted with 25 milliliters of water. The solution is heated on a steam cone and 13.1 grams of 2-chloroethyl tosylate added. The solution is refluxed for 5 hours after which the steam cone is removed and dichloromethane (MC) added to the reaction mixture. The MC layer is dried over sodium sulfate and the MC removed. The residue is crystallized from a toluene-petroleum ether mixture to give 6.3 grams of 1,17-dichloro-4,5,13,14-dibenzo-3,6,9,12,15-pentaoxaheptadeca-4,13-diene (B).

2.5 Grams of B in 40 milliliters absolute alcohol is added to 6.7 grams sodium sulfide nonahydrate in 40 milliliters absolute alcohol and 5 milliliters of water. The reaction mixture is immersed in an oil bath at 100°C. and stirred for 17 hours after which the reaction mixture is chilled and water added. This yields about 1.9 grams of crystals which are washed with water and recrystallized from a toluene-petroleum ether-MC mixture to give 0.6 gram of brown crystals. These crystals sublime at 150°/0.002 mm. Hg. to give 0.597 gram of snow-white sublimate. Two crystallizations of the sublimate from acetone give the pure product II.

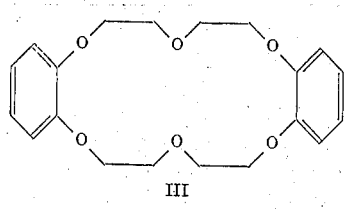

III 1,4,7,10,13,16-Hexaoxa-8,9,17,18-dibenzo cyclooctadeca-8,17-diene having the structure shown at the left is prepared essentially by the method described in C. J. Pedersen, JACS, 89:26, p. 7034, Dec. 20, 1967.

Of the three crowns described above, III is a macrocyclic polyether described in the prior art and is outside the scope of this invention. Crowns I and II are macrocyclic sulfides within the scope of the present invention which are the same as the prior art polyether crown except in I, two oxygen atoms have been replaced by sulfur atoms and in II, one oxygen has been replaced with a sulfur atom.

The following experiments are carried out to compare the complexing behavior of the three aforedescribed crowns:

A. Three mixtures are prepared by adding a 0.05 molar solution of one of each of three aforedescribed crowns in dichloromethane to a 0.05 molar solution of $K_2PdCl_4$ in water. The two solutions are immiscible and two layers form. The water layer is initially yellow in all samples because of the presence of Pd(II). After about one minute, most of the yellow color in the sample containing crown I has been extracted into the dichloromethane solution, even though $K_2PdCl_4$ is insoluble in dichloromethane. The same thing happens, but a bit more slowly, in the sample containing crown II. The third sample remains unchanged; the yellow color stays in the water even after 24 hours.

B. Three .05 molar solutions are prepared by adding the appropriate amount of each of the afore-described crowns to a vessel containing dichloromethane. To 5 milliliters of each solution is added 20 milligrams of potassium permanganate, which is insoluble in dichloromethane. The solution containing crown III develops a pink color in about one minute as the potassium permanganate dissolves. In the solutions containing crowns I and II, however, the crystals do not dissolve and there is slight, if any, color imparted to the dichloromethane after 24 hours.

I claim:

1. A macrocyclic sulfide characterized by a macrocyclic ring of carbon and hetero atoms totaling 12–30 ring atoms, from 4–10 hetero atoms being present in the ring, at least one hetero atom being sulfur and the remainder being oxygen, each hetero atom in the ring being separated from its adjoining hetero atoms in the ring by a saturated 2 to 3 carbon atom chain and the macrocyclic ring being fused by vicinal carbon atoms to 1–4 carbocyclic rings selected from the group:
   a. phenylene and naphthylene,
   b. saturated analogs of (a) and
   c. substitution derivatives of (a) or (b) from the group halo, nitro, amino, $C_1$–$C_4$ alkyl, [$C_2$–$C_4$]alkenyl, $C_6$–$C_{12}$ aryl, $C_7$–$C_{16}$ aralkyl, $C_1$–$C_4$ alkoxy, cyano, hydroxy, carboxy or sulfo derivatives;

provided that a single pair of adjoining ring-sulfur atoms can be methylene-separated.

2. The sulfide of claim 1 in which the hetero atoms are separated by —$CH_2CH_2CH_2$—groups.

3. The sulfide of claim 2 in which at least two hetero atoms are oxygen.

4. The sulfide of claim 1 in which the hetero atoms are separated by —$CH_2CH_2$—groups.

5. The sulfide of claim 4 in which each fused carbocyclic ring is phenylene or a $C_1$–$C_4$ alkyl-substituted phenylene.

6. The sulfide of claim 4 in which each fused carbocyclic ring is cyclohexylene or $C_1$–$C_4$ alkyl-substituted cyclohexylene.

7. The sulfide of claim 4 containing only one fused carbocyclic ring.

8. The sulfide of claim 4 containing only two fused carbocyclic rings.

9. The sulfide of claim 8 in which each fused carbocyclic ring is phenylene or $C_1$–$C_4$ alkyl-substituted phenylene.

10. The sulfide of claim 8 in which at least two hetero-atoms are sulfur and at least two hetero atoms are oxygen.

11. The sulfide of claim 8 in which at least half of the hetero atoms are sulfur and at least two of the hetero atoms are oxygen.

12. 2,3,11,12-Dibenzo-1,7,10,16-tetraoxa-4,13-dithiacyclooctadeca-2,11-diene.

13. 2,3,11,12-Bis(methylbenzo)-1,4,10,13-tetrathia-7,16-dioxacyclooctadeca-2,11-diene.

14. 2,3-(4'-methylbenzo)-1,4-dithia-7,10,13,16-tetraoxacyclooctadeca-2-ene.

15. 2,3-Benzo-1,4-dioxa-7,10-dithiacyclododeca-2-ene.

16. 2,3,7,8-Dibenzo-1,9,12-trioxa-4,6-dithiacyclotetradeca-2,7-diene.

17. 2,8,15,21-Tetrathia-5,18-dioxatricyclo-[20.4.0.0$^{9,14}$]hexacosane.

* * * * *